R. W. McLEAN.
COTTON SEED HULLER.
APPLICATION FILED OCT. 28, 1912.
1,088,085.
Patented Feb. 24, 1914.
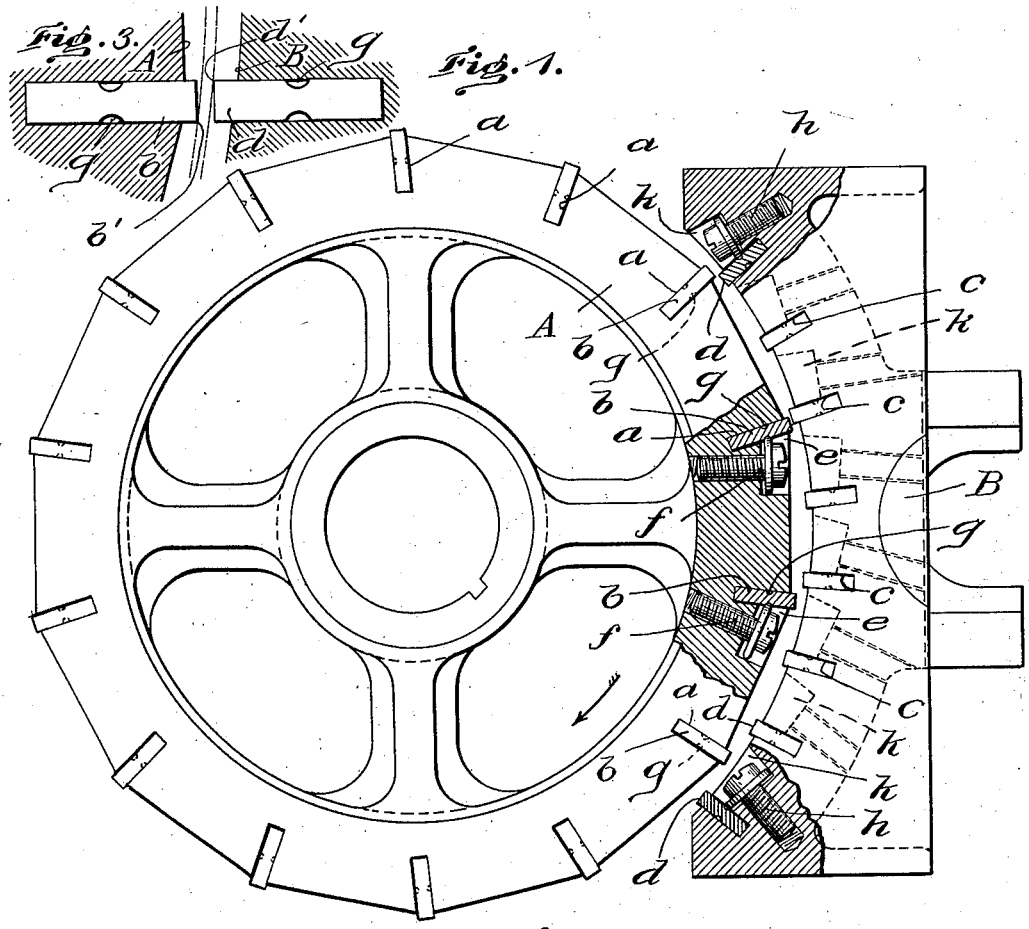
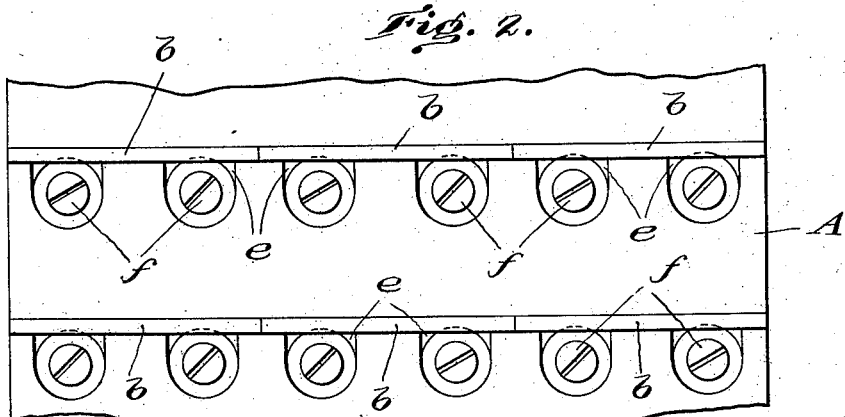
Witnesses:
Josephine H. Ryan
Charles D. Wasberry
Inventor
Robert W. McLean,
by Roberts, Roberts & Cushman,
att'ys.

UNITED STATES PATENT OFFICE.

ROBERT W. McLEAN, OF BRIDGEWATER, MASSACHUSETTS, ASSIGNOR TO CARVER COTTON GIN COMPANY, OF EAST BRIDGEWATER, MASSACHUSETTS, A CORPORATION OF MASSACHUSETTS.

COTTON-SEED HULLER.

1,088,085.  Specification of Letters Patent.  Patented Feb. 24, 1914.

Application filed October 28, 1912. Serial No. 728,044.

*To all whom it may concern:*

Be it known that I, ROBERT W. MCLEAN, a citizen of the United States, and resident of Bridgewater, in the county of Plymouth and State of Massachusetts, have invented new and useful Improvements in Cotton-Seed Hullers, of which the following is a specification.

This invention relates to cotton seed hullers, and its object is to improve and simplify hullers of the type known as bar hullers, especially in respect to the construction of the knives, the arrangement of the knives upon the cylinder and concave, and the mode of securing the knives in position.

In the accompanying drawings, which illustrate one embodiment of the invention; Figure 1 is a side view, partly in vertical section, of the cylinder and concave of a cotton seed huller, containing the invention; Fig. 2 is a front view of a portion of the cylinder illustrating the arrangement of the cylinder knives; and Fig. 3 is an enlarged detail illustrating the relation between co-acting knives of the cylinder and concave.

As the novel features of my new huller are to be found in the cylinder and concave, I have not shown in the drawings the other parts of the machine, which, it will be understood, may be of usual and well known construction.

The cylinder and concave, which may both be termed knife carriers, are shown respectively at A and B. The cylinder A is provided with a series of longitudinally extending knife channels $a$, constituting supporting seats for the knives $b$; and the concave B is provided with a series of similar knife channels $c$, in which are seated the knives $d$. Said channels $a$ of the cylinder, and consequently the cylinder knives $b$, are in inclined planes with relation to the radii of the cylinder, as clearly shown in Figs. 1 and 3 such incline being in the opposite direction to the direction of rotation of the cylinder (indicated by the arrow); and the channels $c$ and knives $d$ of the concave are also in planes inclined to said radii, but such incline is in the same direction as the direction of rotation of the cylinder. As the knives $b$ and $d$ are made with square edges, they constitute double edged knives affording two sharp cutting edges at each side; and said arrangement of the knives inclined to radii of the cylinder presents a forward, salient cutting edge of each set of knives to a similar edge of the other set, while a wide clearance is provided between the following or inoperative sharp edges of the opposed knives. This feature is most clearly illustrated in Fig. 3 where $b'$ and $d'$ represent respectively the forward salient cutting edges of the cylinder and concave knives respectively, and the dotted lines which are drawn concentric to the cylinder and concave show the broad clearance between the following edges and the opposed faces of the two knives due to their angular relation to the knife carriers. By having both sets of knives inclined to radial planes as described, such clearance is double what it would be if only one set were so inclined. Such rear clearance not only protects the following edges of the knives from being injured or dulled, but also substantially increases the efficiency and improves the product of the machine, by reducing the "absorption loss" and the "separation loss." The "absorption loss" is due to the squeezing of the meat of the seeds between the opposed square ends of the knives. If no rear clearance is provided between the square ends of the knives after the seeds are cut or broken by the leading or operative cutting edges, a certain amount of oil will be pressed out of the meats and absorbed by the lint and hulls. This is avoided by said rear clearance between the square ends of the knives resulting from the non-radial position of the knives. Such arrangement also results in the clean cutting of the seeds, as distinguished from the crushing which is characteristic of radially arranged knives, and so the fine meats of the seeds are less mixed with the lint and hulls, thus producing the material in better condition for the separating process which follows the hulling, and reducing the "separation loss."

Opening from the sides of the channels $a$ are counterbores or bolt recesses $e$, for the heads of bolts $f$, which are threaded into the cylinder through said recesses. The heads of said bolts $f$ engage the sides of the blades $b$, which are provided with grooves or recesses $g$ to receive the bolt heads. Recesses $g$ are provided at each side of the knives, midway between the edges of the knives, thus making each knife reversible back for front and end for end and furnishing four different cutting edges. Said bolts *f* are arranged at an angle to the knives, and clamp the knives firmly against the opposite walls of the channels, which afford a solid support for the knives against the heavy strain or working pressure when the cylinder is rotating in the direction of the arrow. The other side of the knives require little support, and the bolts are required to do little work other than to hold the knives in their seats against centrifugal force. As the bolts *f* are at an angle to the knives it is not necessary wholly to remove them in order to remove a knife, but by merely loosening them the knives may be pulled out from the channels endwise, or by loosening the bolts enough to clear the recesses *g* the knives may be removed edgewise from their channels.

Each knife *b* is preferably made in two or more sections, as shown in Fig. 2,—three such sections being shown in the drawings,—and each section is secured by two bolts *f*. It is therefore possible to remove any one section independently and without disturbing any of the others, which is frequently desirable since the breaking or nicking of the edge of a knife rarely affects more than a single small portion of the knife. With this sectional construction the injured part may be replaced without removing the whole knife. All of said knife sections are identical, and each may be interchanged with any other section of any knife in the series, and also with any section of any knife in the concave series. Bolts *h* and recesses *k* are provided for the concave B, identical in all respects with the bolts *f* and recesses *e* of the cylinder, for removably holding the knives *d* in place. In the concave the knives are supported on the lower side by the lower walls of the channels *c* which is the side receiving the working strain when the cylinder is rotating in the direction of the arrow.

I claim:

1. In a cotton seed huller, a knife carrier having a series of knife channels opening through the sides of the carrier and bolt recesses opening from the sides of said channels, knives, all the longitudinal edges of which form cutting edges, seated within said channels and bearing against one side thereof, said knives each having a shallow groove in opposite sides extending throughout the length of the knife, and bolts threaded into said knife carrier through said bolt recesses at an angle to said knives, the heads of said bolts engaging the grooves in the exposed sides of said knives to firmly hold them in their channels, the bolts being adapted to be loosened whereby to admit the sliding of the knives longitudinally and to be further loosened to admit the lifting of the knives from the channels.

2. In a cotton seed huller, a knife carrier having a plurality of knife holding channels opening through the ends of the carrier, knives in said channels, each arranged to bear against one side of its channel under working strain or pressure, said knives being of rectangular cross-section each with a cutting edge on all the longitudinal corners, a longitudinal groove in each side of each knife midway the cutting edges, to balance the knives in the carrier when secured in any of their positions, and bolts screwed into said knife carrier for holding the knives in their channels, the heads of said bolts engaging one of the grooves in said knives to press them against the sides and toward the bottoms of the seats, the bolts being adapted to be loosened to admit the sliding of the knives endwise from the channels.

3. In a cotton seed huller, a knife carrier having a series of knife channels and bolt recesses opening upon the sides of said channels, a knife within each of said channels, said knife having a longitudinal groove on each side, and a bolt threaded into said knife carrier through each bolt recess, said bolt having a bead on its head to engage one of the longitudinal grooves in the knife to force said knife against the side and bottom of the knife channel and positively hold the same rigidly in position in the knife carrier, the bolts being adapted to be loosened to loosen the heads in the recesses whereby the knives may be removed longitudinally from the channels.

4. In a cotton seed huller having a knife carrier, a knife for the same comprising a rectangular bar of metal, all of the longitudinal edges of which form cutting edges, and having a longitudinal groove on each side of the knife bar midway between the cutting edges for a knife holding means whereby said knife may be interchanged with any other knife of the machine or any edge of said knife may be employed as a cutting edge without disturbing the balancing of the knives in the carrier.

5. In a cotton seed huller, a knife carrier, and a series of knives removably, reversibly and interchangeably secured to said knife carrier, each knife being divided into a plurality of separate and identical knife-sections, and each of said knife-sections being interchangeable and reversible with any section of any knife in the series.

6. In a cotton seed huller, a knife carrier, a series of knives removably, reversibly and interchangeably secured to said knife carrier, each knife being divided into a plurality of separate and identical knife-sections, and each of said knife-sections being interchangeable with any section of any knife in the series, and means to fasten said knife-sections in place adapted to permit the removal and the reversing of any individual knife-section without disturbing any of the other knife-sections.

7. In a cotton seed huller, a knife carrier, a series of knives removably, reversibly and interchangeably secured to said knife carrier, each knife being divided into a plurality of separate and identical knife-sections, and each of said knife-sections being interchangeable and reversible with any section of any knife in the series, said knife-sections being provided with grooves in their sides extending throughout the length of the knife-section, and bolts threaded into said knife carrier at an angle to said knives, the heads of the bolts engaging the grooves in the several knife sections whereby any knife-section may be removed and reversed by loosening the bolts by which it is secured, without removing said bolts and without disturbing any other knife-section.

Signed by me at Boston, Massachusetts, this 18th day of October, 1912.

ROBERT W. McLEAN.

Witnesses:
ROBERT CUSHMAN,
CHARLES D. WOODBERRY.

Copies of this patent may be obtained for five cents each, by addressing the "Commissioner of Patents, Washington, D. C."